United States Patent
Anderson et al.

(10) Patent No.: US 10,436,649 B2
(45) Date of Patent: Oct. 8, 2019

(54) ICING RESISTANCE TOTAL TEMPERATURE PROBE WITH INTEGRATED EJECTOR

(71) Applicant: Honeywell International Inc., Morris Plains, NJ (US)

(72) Inventors: Morris G. Anderson, Mesa, AZ (US); Zachary Price, Morris Plains, NJ (US); Doug Hollingshead, Phoenix, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 227 days.

(21) Appl. No.: 15/583,799

(22) Filed: May 1, 2017

(65) Prior Publication Data

US 2018/0313698 A1    Nov. 1, 2018

(51) Int. Cl.
*G01K 1/20* (2006.01)
*G01K 13/02* (2006.01)

(52) U.S. Cl.
CPC .............. *G01K 1/20* (2013.01); *G01K 13/02* (2013.01); *G01K 13/028* (2013.01); *G01K 2205/02* (2013.01)

(58) Field of Classification Search
CPC ........... G01K 13/028; G01K 2013/024; G01K 13/02; B64D 15/20; B64D 43/02; G01N 15/0826
(Continued)

(56) References Cited

U.S. PATENT DOCUMENTS 2,588,840 A    3/1952 Howland
2,928,279 A    3/1960 Schober
(Continued)

FOREIGN PATENT DOCUMENTS

EP    1586877 A1    10/2005
EP    1837636 A1    9/2007
(Continued)

OTHER PUBLICATIONS

European Patent Office, "Extended European Search Report from EP Application No. 18169377.1 dated Sep. 26, 2018", "from Foreign Counterpart of U.S. Appl. No. 15/583,799", filed Sep. 26, 2018, pp. 1-8, Published in: EP.
(Continued)

*Primary Examiner* — Gail Kaplan Verbitsky
(74) *Attorney, Agent, or Firm* — Fogg & Powers LLC (57) ABSTRACT

Embodiments of icing resistant total temperature probes with integrated ejectors are provided. One air data probe comprises: a base; a body having a leading and trailing edges: a first passage defining a first annulus; a temperature sensor within the first passage; a heat shield defining an exterior wall of at least part of the first passage, wherein the sensor is positioned within the shield; a second passage comprising a second annulus defined by a space between the shield and the body; an intake port having an intake aperture that opens to the first and second passages; a separate heated airflow passage, the heated airflow passage having an air input port configured to couple to an air supply source and following a path within the probe body; an integrated air ejector coupled to heated airflow passage to motivate air into the intake aperture and through the first and second air passages.

20 Claims, 6 Drawing Sheets

(58) Field of Classification Search
USPC .............. 374/7, 135, 138, 143, 148, 208
See application file for complete search history.

(56) References Cited

U.S. PATENT DOCUMENTS

| | | | |
|---|---|---|---|
| 2,970,475 A | 2/1961 | Werner | |
| 3,170,328 A | 2/1965 | Werner et al. | |
| 5,653,538 A | 8/1997 | Phillips | |
| 6,076,963 A | 6/2000 | Menzies et al. | |
| 6,609,825 B2 | 8/2003 | Ice et al. | |
| 6,702,233 B1* | 3/2004 | DuPont | B64D 15/04 244/134 B |
| 7,174,782 B2 | 2/2007 | Ice | |
| 7,328,623 B2 | 2/2008 | Slagle et al. | |
| 7,357,572 B2 | 4/2008 | Benning et al. | |
| 7,441,948 B2* | 10/2008 | Bernard | G01K 13/02 374/135 |
| 7,984,647 B2* | 7/2011 | Severson | G08B 19/02 73/170.26 |
| 8,104,955 B2 | 1/2012 | Benning et al. | |
| 8,806,934 B2 | 8/2014 | Goedel | |
| 8,864,370 B2 | 10/2014 | Dijon et al. | |
| 9,243,963 B2 | 1/2016 | Thorpe et al. | |
| 9,429,481 B2 | 8/2016 | Agami | |
| 2003/0005779 A1* | 1/2003 | Bernard | G01K 13/02 73/861.65 |
| 2004/0017763 A1 | 1/2004 | Tawa et al. | |
| 2005/0066722 A1 | 3/2005 | Magnin | |
| 2006/0056489 A1 | 3/2006 | Bernard et al. | |
| 2007/0220984 A1* | 9/2007 | Slagle | G01K 13/02 73/708 |
| 2008/0285620 A1 | 11/2008 | Benning et al. | |
| 2009/0154522 A1 | 6/2009 | Kulczyk | |
| 2013/0022076 A1 | 1/2013 | Dijon et al. | |
| 2014/0064330 A1* | 3/2014 | Agami | G01K 13/028 374/138 |
| 2014/0169403 A1 | 6/2014 | Nakamura | |
| 2015/0063414 A1 | 3/2015 | Wigen et al. | |
| 2015/0103863 A1* | 4/2015 | Herman | G01K 13/028 374/138 |
| 2016/0238456 A1 | 8/2016 | Wigen | |
| 2018/0143082 A1 | 5/2018 | Anderson et al. | |
| 2018/0188118 A1 | 7/2018 | Anderson et al. | |

FOREIGN PATENT DOCUMENTS

| | | |
|---|---|---|
| EP | 2863195 | 4/2015 |
| EP | 2863195 A1 | 4/2015 |
| EP | 2866011 A2 | 4/2015 |
| EP | 3056884 A1 | 8/2016 |

OTHER PUBLICATIONS

U.S. Patent and Trademark Office, Notice of Allowance for U.S. Appl. No. 15/399,611 dated Oct. 22, 2018. pp. 1-17, Published in: US.

U.S. Patent and Trademark Office, "Office Action from U.S. Appl. No. 15/359,442 dated Oct. 4, 2018", pp. 1-19, Published in: US.

European Patent Office; "Extended European Search Report from EP Application No. 17201974.7 dated Apr. 9, 2018"; from Foreign Counterpart of U.S. Appl. No. 15/359,442 Dated: Apr. 9, 2018; pp. 1-9; Published: EP.

European Patent Office; "Extended European Search Report from EP Application No. 18150116.4 dated Apr. 26, 2018"; from Foreign Counterpart of U.S. Appl. Application No. 15/399,611; Dated: Apr. 26, 2018; pp. 1-5; Published: EP.

U.S. Patent and Trademark Office, "Supplemental Notice of Allowability from U.S. Appl. No. 15/399,611", filed Nov. 15, 2018, pp. 1-4, Published in: US.

United Sensor, "Temperature & Thermocouple Probes", "retrieved Oct. 5, 2016 from http://www.unitedsensorcorp.com/temperature.html", 2015, pp. 1-2.

U.S. Patent and Trademark Office, "Restriction Requirement from U.S. Appl. No. 15/399,611 dated Aug. 27, 2018", pp. 1-5, Published in U.S.

U.S. Patent and Trademark Office, "Notice of Allowance", U.S. Appl. No. 15/399,611, dated Feb. 13, 2019, pp. 1-11, Published: US.

U.S. Patent and Trademark Office, "Notice of Allowance", U.S. Appl. No. 15/359,442, dated Apr. 17, 2019, pp. 1-17, Published: US.

\* cited by examiner

ICING RESISTANCE TOTAL TEMPERATURE PROBE WITH INTEGRATED EJECTOR

BACKGROUND

Many aircraft engines, such as turbofan and turboprop engines, require an accurate measurement of Total air temperature (TAT) at the engine intake in order to function properly. However, total air temperature probes are often subjected to in-flight conditions with high concentrations of super cooled water droplets and/or ice crystals. Under these conditions, total air temperatures probes available in the art today have been known to become plugged with ice or a mixture of ice and water which can cause an error in the temperature measurement. It is not uncommon for total air temperature probes that have been plugged in this manner to yield a temperature measurement that is off by 25° C. from the true value. This can cause problems because some engine control systems are dependent on an accurate inlet total temperature measurement. For example, ice plugging of the inlet total air temperature probe can cause the engine control to command the engine to increase or decrease thrust when it is not desired. Moreover, because the purpose of the air temperature probe is to measure the airstream entering the engine, the probe is normally positioned upstream of the engine fan or compressor. Therefore, ice that forms and then detaches from the probe body is highly likely to impact these engine components potentially causing damage to the engine. Finally, for aircraft engines having relatively low air intake velocities, such as turboprop engines, there may be insufficient dynamic air pressure to keep a sufficient airflow moving through the probe to obtain an accurate total air temperature measurements under these conditions.

For these reasons, and other reasons that may be set forth below, there is a need in the art for an icing resistant total temperature probe with integrated ejector.

SUMMARY

Embodiments of the present disclosure provide methods and systems for an icing resistant total temperature probe with integrated ejector and will be understood by reading and studying the following specification.

In one embodiment, an air data probe comprises: a probe base; a probe body having a leading edge and a trailing edge and extending from the probe base along a first axis, the probe body comprising: a first interior airflow passage defining a first annulus aligned with the first axis; a temperature sensor positioned within the first airflow passage and aligned with the first axis; a tubular heat shield defining an exterior wall of at least part of the first interior airflow passage, wherein the temperature sensor is positioned within the tubular heat shield; a second interior airflow passage comprising a second annulus aligned with the first axis, wherein the second annulus is defined by a space between the tubular heat shield and an interior wall of the probe body, wherein the tubular heat shield separates the first annulus from the second annulus; an intake port positioned at a distal end of the probe body, the intake port having a free airstream intake aperture that opens to the first interior airflow passage and the second interior airflow passage; a heated airflow passage separate from the first interior airflow passage and the second interior airflow passage, the heated airflow passage having a forced air input port configured to couple to a pressurized air supply source, the heated airflow passage following a path that travels within the probe body; an integrated air ejector coupled to heated airflow passage, the integrated ejector configured to motivate a free stream of air into the free airstream intake aperture and through the first and second air passages to an ejector exhaust port.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure introduce an improved Total Air Temperature (TAT) probe that utilize pressurized heated air (such as bleed air from an aircraft engine compressor, for example) to heat the probe body of the total air temperature probe while also implementing an integrated ejector that is configured to draw air through the probe so that the probe can read ambient total air temperatures properly while keeping the temperature sensor in the probe from being inadvertently heated in a way that would bias temperature measurements.

It should be understood that the present disclosure uses the term "total air temperature" as that term would be understood by those of ordinary skill in the fields of aviation and fluid dynamics. That is, a total air temperature is a measurement of a stream of air if it were brought to rest relative to the aircraft. A total air temperature is distinguished from a static air temperature. More specifically, total air temperature differs from static air temperature as a function of the square of airflow velocity. This relationship may be expressed by Bernoulli's Equation. For example, air which has been slowed due to impacting with the nose of an inflight aircraft will have a higher temperature than air that is flowing without obstruction along the side of an aircraft. Conversion of static air temperatures into total temperature in a sense normalizes temperature measurements by accounting for differences in airflow velocities as temperature measurements are obtained.

Figure 1:
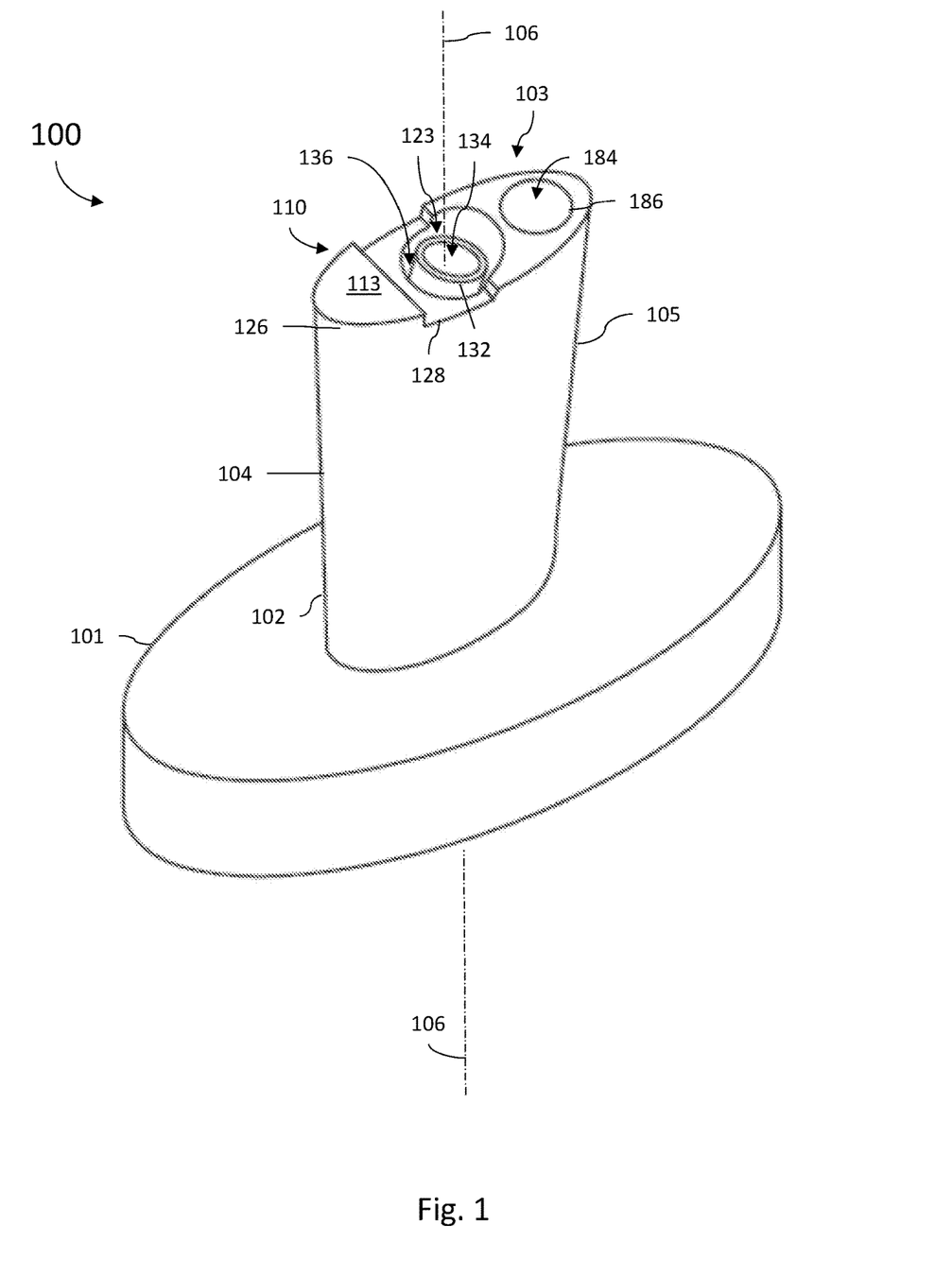
FIG. 1 is diagram illustrating a total air temperature probe of one embodiment of the present disclosure.
Figure 2A:
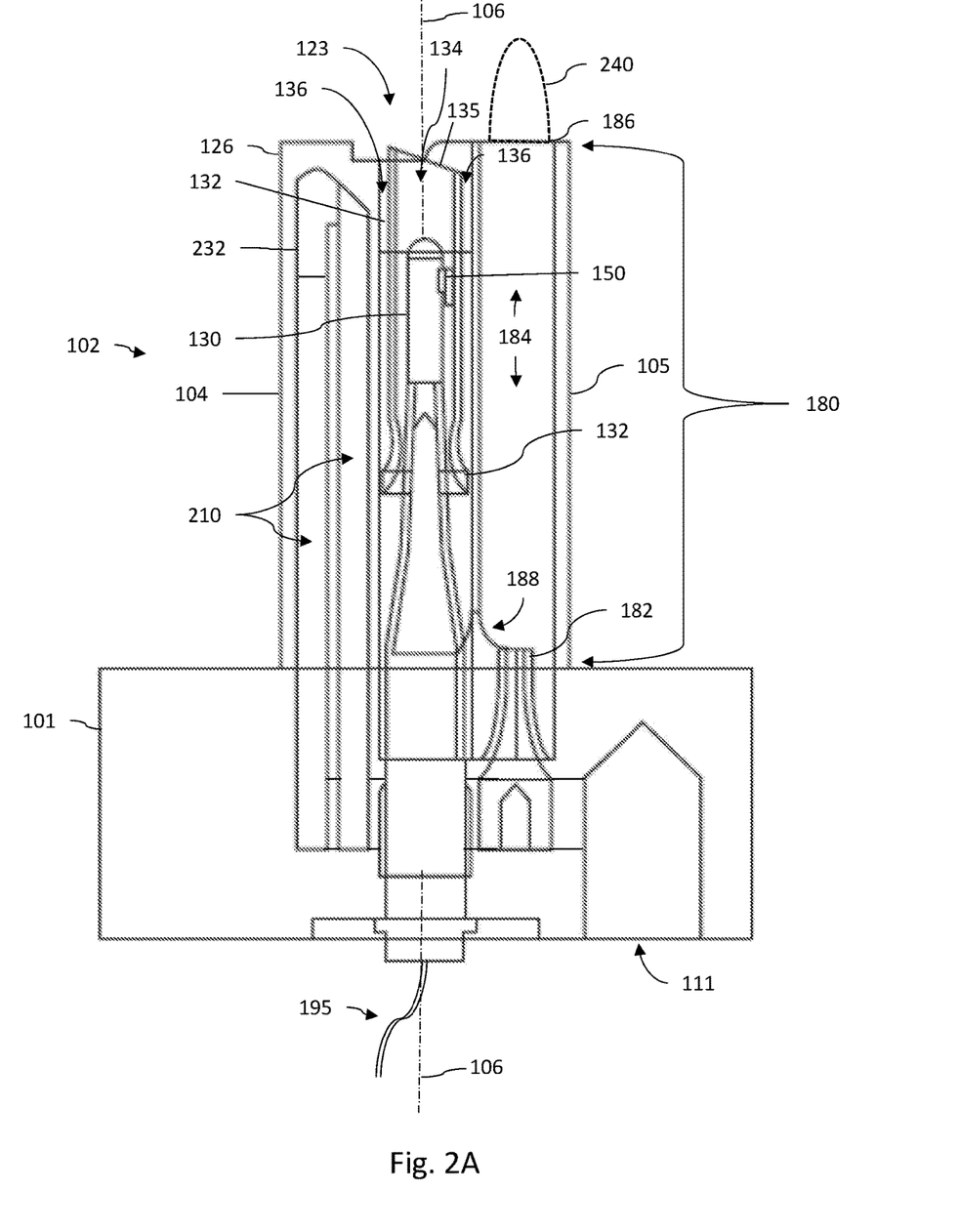
FIGS. 2A and 2B are a diagrams providing a cutaway cross-sectional view exposing interior features of the probe of FIG. 1.
Figure 2B:
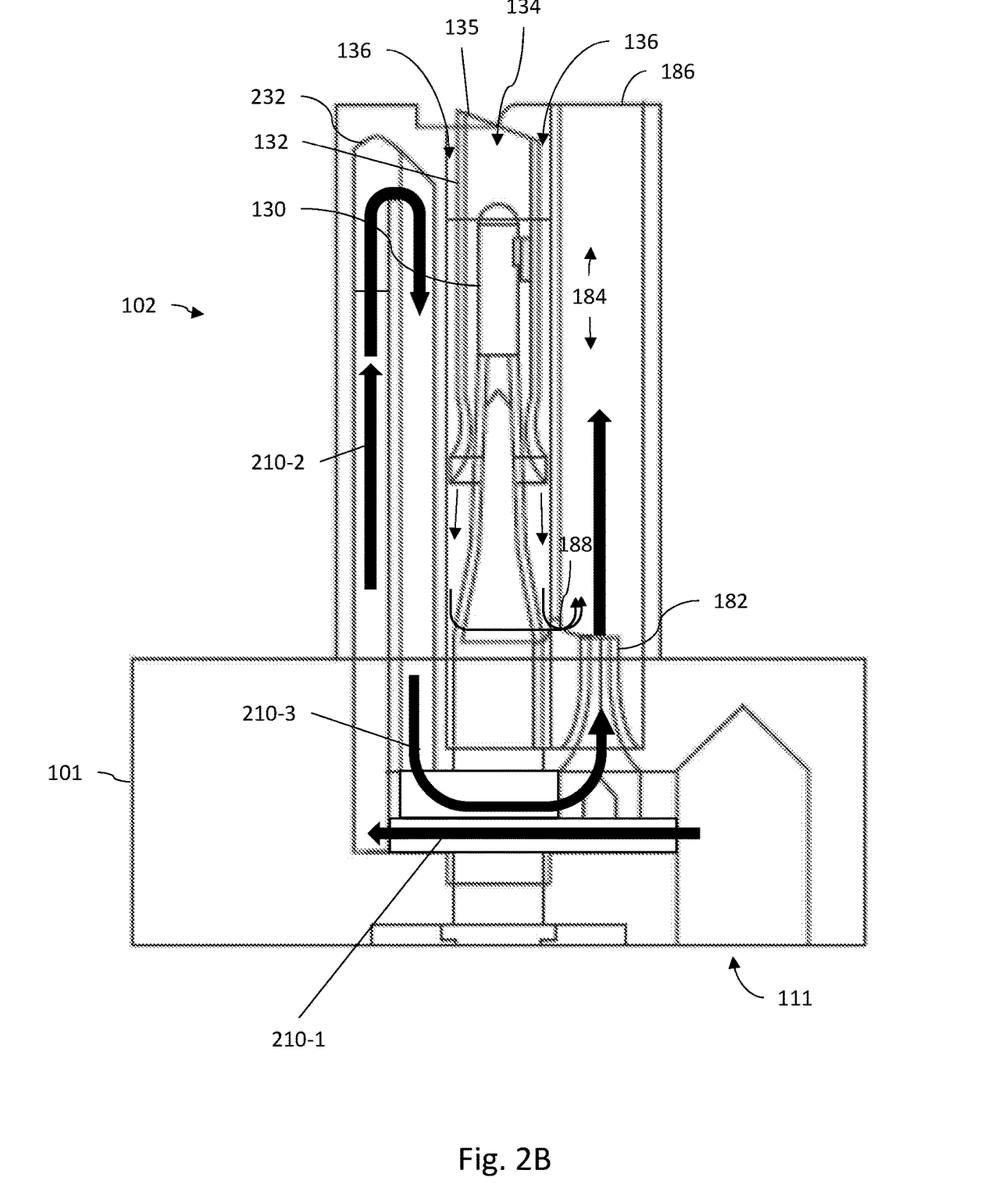

FIGS. 1, 2A and 2B are diagrams illustrating a TAT probe 100 of one embodiment of the present disclosure. FIG. 1 illustrates an exterior surface profile and features of probe 100 while FIGS. 2A and 2B illustrates a cutaway cross-sectional side view exposing interior features of probe 100. It should be understood that the various features and elements of probe 100 discussed herein may appear in one or more of the FIGS. 1, 2A and 2B.

TAT probe 100 comprises a base member 101, a probe body 102 extending from the base member 101 along a first axis 106, and a forced air input port 111. As further discussed below, the forced air input port 111 (shown in FIGS. 2A and 2B and which may also be referred to herein as the heated bleed air input port 111) may be located in the base 101 of the probe 100 or other convenient position in probe body 102. In some embodiments, one or both of the base 101 and probe body 102, or any of the other components of probe 100 discussed herein may be fabricated using Direct Metal Laser Sintering (DMLS).

Figure 5:
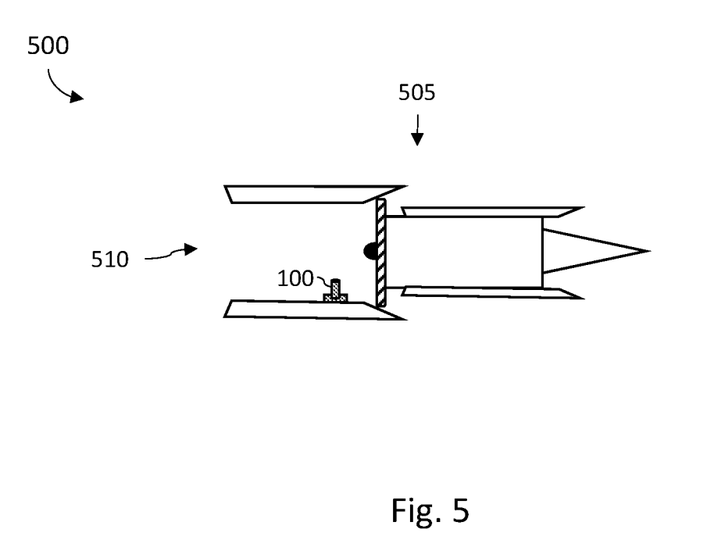
FIG. 5 is a diagram illustrating a mounted total air temperature probe of one embodiment of the present disclosure.

Base member 101 is used to attach the TAT probe 100 to an aircraft fuselage or other surface of the aircraft and may therefore comprise one or more mounting or fastening features (such as, but not limited to a flange, screws, bolts, tabs, clasps, latches, and the like) known to those of skill in the art for mounting TAT probe 100 to the aircraft. In one embodiment the first axis 106 is aligned normal to a plane of the base member 101. The probe may be mounted to an aircraft such that the probe is exposed of the free stream total temperature. In one embodiment, with TAT probe 100 mounted to an aircraft, a distal end 103 of probe body 102 protrudes away from the aircraft surface to which the base member 101 is mounted, so that it may extend into a free airflow created when the aircraft is in flight. In some embodiments, TAT probe 100 is mounted to an aircraft surface that exposes probe body 102 to an airflow that passes around the aircraft while in flight. Alternatively, in other embodiments, TAT probe 100 is mounted, for example, to or near an aircraft engine intake and exposed to the free air stream flow that passes into that engine intake and through the engine. For example, as shown in FIG. 5 at 500, a TAT probe 100 may be mounted onto an engine 505 such that the probe base 101 is mounted upstream of the engine 505 inside of the engine inlet 510.

As shown in FIG. 1, probe body 102 further includes a leading edge 104 which defines the portion of the surface of probe body 102 that faces into the airflow when the aircraft is in flight, and a trailing edge 105 which defines the opposing back side of probe body 102 opposite to the leading edge 104. In alternate embodiments, the probe body 102 may be cylindrical, tapered, or of arbitrary shape.

As shown in FIG. 1, the distal end 103 of probe body 102 comprises an intake port 110 that feeds air into a free airstream intake aperture 123. The intake port 110, as discussed in greater detail below, creates a high pressure region over the intake aperture 123 that directs air into the intake aperture 123 and further into the first and second annuluses 134 and 136.

In some embodiments, the intake port 110 may optionally further comprise slot 128 inset from the face 113 of the intake port 110 that traverses across at least a portion of the intake aperture 123. The slot 128 may be separated from the leading edge 104 by a lip 126. In such an embodiment, the face 113 of the intake port 110 may be oriented normal to the probe axis 106 and is otherwise a flat surface.

TAT probe 100 further comprise an air ejector such as shown generally at 180 in the cross-sectional illustration in FIGS. 2A and 2B. The air ejector 180 includes an integrated ejector nozzle 182, an ejector exhaust chamber 184, and at least one ejector exhaust port 186. In FIG. 2, the ejector exhaust port 186 is positioned on the distal end of probe tip 103. It should, however, be appreciated that in alternate embodiments, the ejector flow can be exhausted through vents on the probe tip 103, trailing edge 105, and/or and side of the probe body 102.

The ejector exhaust chamber 184 includes a low pressure aperture 188 that opens along a wall of the ejector exhaust chamber 184 and may be proximate to the integrated ejector nozzle 182. The first interior airflow passage and the second interior airflow passage become merged together within the probe body 102 to exit at the low pressure aperture 188 and thus discharge into the ejector exhaust chamber 184. In the particular embodiment illustrated in FIG. 1, the ejector 180 is located in the trailing edge 105 of the probe body 102 and runs parallel to the probe axis 106. In other embodiments, the ejector 180 may be located at another position within the probe body 102.

In operation, a heated high pressure airflow is delivered to the integrated ejector nozzle 182, which functions as a flow restrictor. A drop in the pressure of the ejector airflow entering the ejector exhaust chamber 184 draws in air from the first annulus 134 and the second annulus 136 via the low pressure aperture 188. These three combined airflows are ejected together through from the ejector exhaust port 186. The result is the motivation of airflows through the first and second annuluses 134 and 136, even when the probe body 102 is not provide a natural airflow from being in flight.

When an aircraft with probe 100 is in flight, the leading edge 104 is oriented into the direction of travel so that a free airstream flows around probe 100. A portion of the airstream is directed into the intake aperture 123 and motivated by the ejector 180 to travel along a plurality of interior airflow passages within the body 102 of probe 100 as shown in FIGS. 2A and 2B. In one embodiment, a first airflow passage directs air entering intake aperture 123 through a first annulus 134, across a temperature sensor element 130, and into the ejector exhaust chamber 184 via low pressure aperture 188. The first annulus 134 is formed between the sensor element 130 and a tubular heat shield 132 as shown in FIG. 2. The tubular heat shield 132 is open to the intake aperture 123 at its first end and the temperature sensor element 130 is positioned within the tubular heat shield 132 at its second end. Air entering through the intake aperture 123 and into the first end of the tubular heat shield 132 thus flows over the temperature sensor element 130 before exiting into the ejector exhaust chamber 184 via low pressure aperture 188.

Temperature sensor element 130 comprises a device that outputs an electrical signal that varies as a function of air temperature it senses. The resulting electrical signal from probe 100 may be sampled or otherwise converted into data representing total air temperature measurements which may be provided to various onboard avionics for various purposes. In one embodiments, the TAT probe 100 includes a set of wires 195 coupled to the temperature sensor element 130 that extend from the temperature sensor element 130 through the base member 101 so that the temperature sensor element 130 can be connected to the onboard avionics.

In one embodiment, the tubular heat shield 132 may comprise a sheath of insulating material that blocks heat radiated by the heated probe body 102 from radiating to either the temperature sensor element 130 or the air flow in the annulus 134 being measured by temperature sensor element 130. It should be noted that although heat shield 132 is described as being "tubular," this description should not be interpreted to infer that it necessarily has a round or circular cross-section. Heat shield 132 may be implemented as a sheath having any other cross sectional shape, and may vary in size along different portions of its length. For example, in one embodiment, the tubular heat shield 132 and the first annulus 134 which its interior defines, may vary in shape to follow a contour of the temperature sensor element 130. The tubular heat shield 132 may be secured or stabilized within the probe body 102 by one or more standoffs (for example, as shown at 150 in FIG. 2) that couple the tubular heat shield 132 to the probe body 102 to prevent shifting or rattling of the tubular heat shield 132, and/or to prevent a dislodged tubular heat shield 132 from obstructing either the first or second interior airflow passages.

A second portion of the airstream directed into the intake aperture 123 is directed through a second annulus 136 and across the exterior surfaces of heat shield 132 before exiting into the ejector exhaust chamber 184 via low pressure aperture 188. The second annulus 136 is thus formed between the tubular heat shield 132 and an interior wall of the probe body 102 and as such defines a passage where air flow across the exterior of the tubular heat shield 132. The second internal airflow passage incorporated within probe body 102 thus may be utilized insulate the tubular heat shield 132 from the heated probe body 102.

As such, the airstream entering intake aperture 123 splits between the first annulus 134 and the second annulus 136. The cool air flowing around the outside of the heat shield 132 in the second annulus 136 keeps the heat shield 132 cool. Air that has thusly absorbed heat from the heatshield exhausts out from the probe body 102 through the ejector exhaust port 186. Air entering the first annulus 134 is directed across the temperature sensor element 130 so that total air temperature measurements may be obtained. After passing across the temperature sensor element 130, this airstream exhausts out from ejector exhaust port 186. As a result, the temperature sensor element 130 within the probe body 102 is kept at the same total temperature as the free stream airflow entering into the intake aperture 123.

The air traveling through the second airflow passage will inherently be heated by the interior surfaces of the probe body 102. Separation of the first interior airflow passage from the second interior airflow passage by the heat shield 132 prevents undesired biasing of the temperature sensor element due to heat dissipating from the probe body 102 itself. As such, the free stream airflow flowing through the first annulus 134 and past the sensor element 130 will be at the total air temperature of the free steam air in the environment surrounding the exterior of the probe.

It should be noted that the ejector 180 generated airflows may also serve the purpose of allowing the TAT probe 100 to operate on-ground by drawing air across the sensor element 130 so that TAT data can be obtained. In addition, the ejector could be used to draw in air to keep the TAT probe 100 from overheating with the aircraft stationary and/or on the ground if the probe was electrically heated and the ejector air was not.

Figure 3:
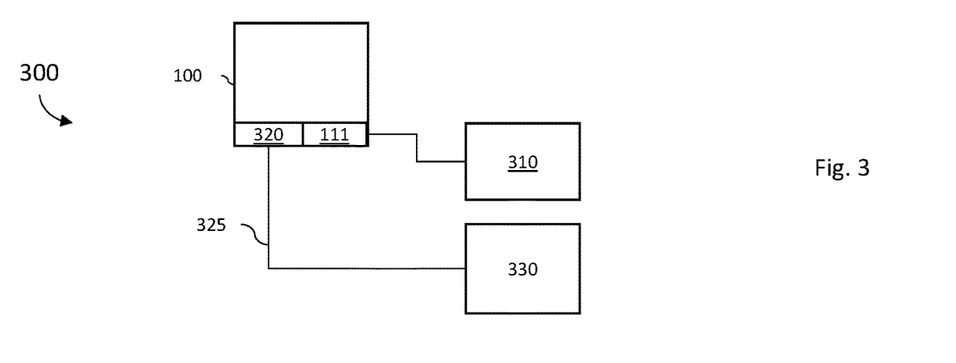
FIG. 3 is a block schematic diagram of an on-board total air temperature data probe deicing system utilizing the probe of FIG. 1.

As discussed above, bleed air from an engine compressor or other on-board pressurized air source, is used to heat the probe body as well as provide the pressurized airflow for operating the integrated ejector 180. To provide the bleed air, an independent forced air flow is supplied into the forced air input port 111. Such a configuration is illustrated in FIG. 3 by the block schematic diagram at 300 where the forced air input port 111 of a TAT probe 100 is coupled to at least one on-board forced air supply device 310, such as but not limited to an air compressor. For example, in some embodiments, bleed air from a jet aircraft engine compressor may be available and coupled to the forced air input port 111 to provide a pressurized heated air supply. For a typical aircraft engine, such an engine compressor may be expected to deliver to the forced air input port 111 a supply of pressurized heated air at a temperature approximately in the range of 500 to 1000 degrees Fahrenheit depending on the engine design. Alternately, forced air supply device 310 may comprise a device that provides a non-heated pressurized air supply which is then run past a heating element or through a heat exchanger prior to delivery to the forced air input port 111. In still another embodiment, a non-heated pressurized air supply 310 may deliver the forced air input port 111 while an optional heating element 320 within the base 101 or probe body 102 of probe 100 is used to heat that forced air supply. For example, FIG. 3 illustrates a heating element 320 internal to probe 100, which may be located with within the base 101 or probe body 102. Heating element 320 may comprise a restive heating element comprising a wire, cable, or film that is dissipates heat generated by the flow of electrical current. In such embodiments, the TAT probe 100 can include a set of wires 325 coupled to the heating element 320 that extend from the heating element 310 through the base member 101 so that the heating element 310 can be connected to onboard electrical power and control circuitry 330.

Regardless of how it is produced, heated high-pressure air is routed through yet another internal airflow passage to heat the thermal mass of the probe body 102. The heated high-pressure air flows from the bottom of the probe body 102 and travels a separate air passage 210 within the probe body 102 before exiting into the ejector exhaust chamber 184 via the integrated ejector nozzle 182. This separate air passage is referred to herein as the heated airflow passage 210. The cross-sectional view of FIGS. 2A and 2B illustrate an example embodiment of one such heated airflow passage 210. In this embodiment, the heated airflow passage 210 directs the high-pressure air from the forced air input port 111 towards the leading edge 104 (shown at 210-1) and up towards the intake port 110 (shown at 210-2). In some embodiments, the air may travel up the leading edge 104 side of the probe body 102 and towards the intake port 110 (shown at 210-2). With this path, the heated airflow passage 210 thus directly supply's heat to the region of the probe body 102 that impacts with super cooled water droplets or ice crystals in the free air flow. In one embodiment, the heated airflow passage 210 may next lead the heated high-pressure air around the circumference of the intake aperture 123 towards the trailing edge 104 side of the body probe 102 (as shown at 210-3), and then out through the integrated ejector nozzle 182.

It should be noted that this particular example passage configuration should not be considered limiting as in other implementations, heated bleed air may instead by introduced at another position into the probe body, and/or the heated interior airflow passage 210 may instead route the heated air up one or both side edges of the probe body 102, down the leading edge 104, and then to the integrated ejector nozzle 182. In some embodiments, the heated interior airflow passage 210 may further include interior fins, pins, or other surface area increasing elements (shown at 232) protruding into the passage 210 to facilitate the transfer of heat from the bleed air to the mass of the probe body 102.

Regardless of the particular configuration of the heated interior airflow passage 210, after heating the probe body 102 by traversing through the heated interior airflow passage, the bleed air arriving at the integrated ejector nozzle 182 shoots into the ejector exhaust chamber 184 creating a low pressure region at the low pressure aperture 188 which pulls in air from the low pressure aperture 188 to motivate the airflow through the first and second airflow passages 134 and 136. The bleed air expands at a high velocity as it enters the ejector exhaust chamber 184, pushing out air already in the ejector exhaust chamber 184 out from the ejector exhaust port 186 positioned at the distal surface 103 of the probe tip 110. This in turn creates a partial vacuum at the low pressure aperture 188 that pulls air into the ejector exhaust chamber 184 from the low pressure aperture 188.

In one embodiment, discharged air from the ejector exhaust port 186 posited at the distal surface 103 of the probe tip 110 creates a high pressure region 240 aft of the free airstream intake aperture 123. This high pressure region 240 slows the free stream air passing body 102 which assists in turning the free steam air into the free airstream intake aperture 123. With this design, even at relative low free steam air flow velocities (on the order of 0.1 to 0.3 Mach, for example) a sufficient stream of free steam air will flow past the sensor element to obtain a total air temperature measurement while avoiding the build-up of, or clogging of the probe body due to, ice crystals.

In other embodiments, the trailing edge of the probe tip 110 may also, or instead, extend into the free steam air to define a notched probe tip 110 that also serves to direct free steam air into the free airstream intake aperture 123. Such a design may be used to extend the operating range free steam air flow velocities in which the probe may function (for example, to a range on the order of 0.1 to 1 Mach).

Figure 4:
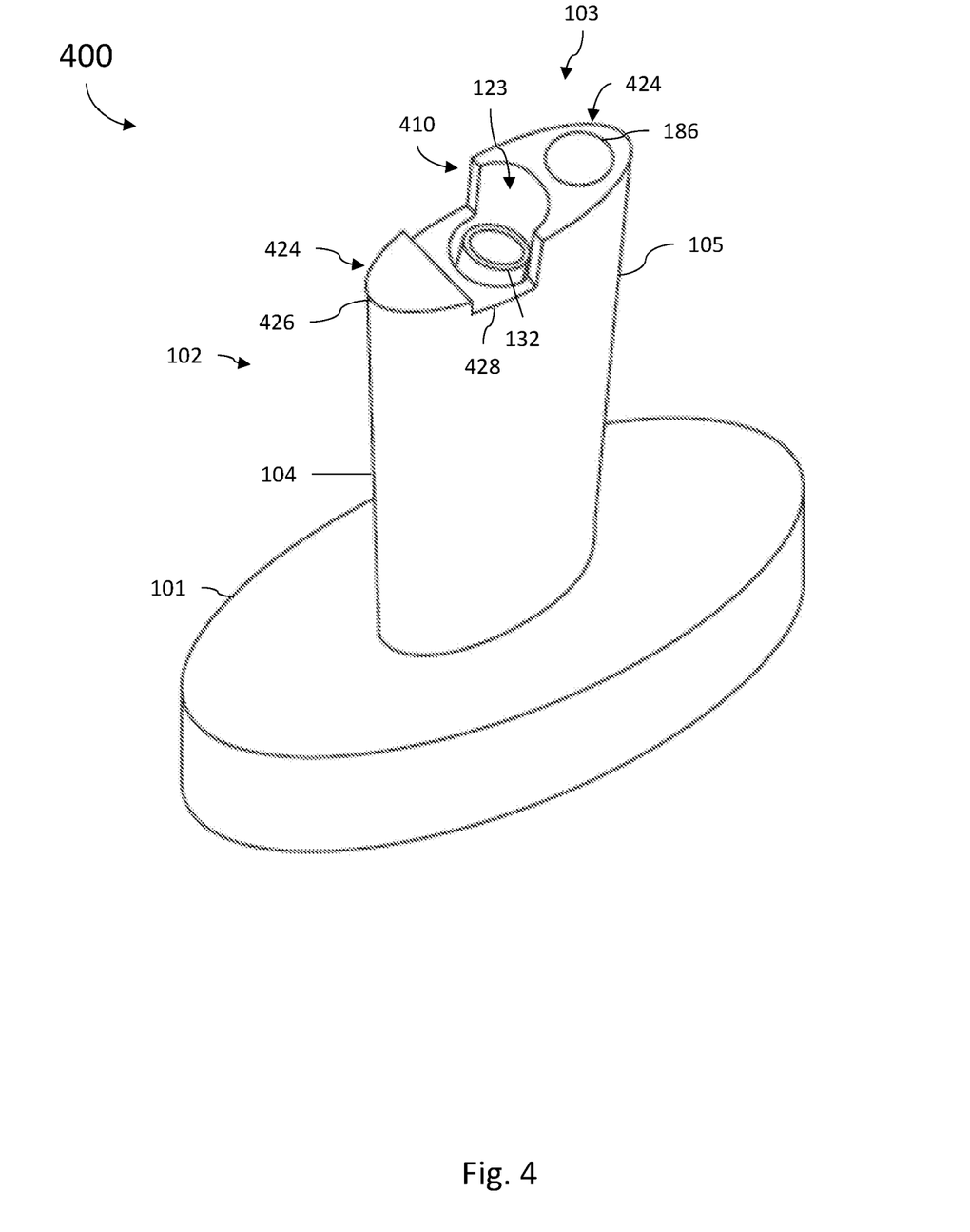
FIG. 4 is a diagram illustrating an alternate total air temperature probe of one embodiment of the present disclosure.

FIG. 4 illustrates such an alternate implementation of TAT probe 100 where the distal end 103 comprises an optional notched intake port 410. As such, elements of the TAT probe 100 shown in FIG. 4 may be used in conjunction with, in combination with, or substituted for elements of any of the embodiments discussed herein and vice versa. Further, it should be understood that the functions, structures and other description of elements for embodiments described herein may apply to like named or described elements in any of FIGS. 1, 2A, 2B, 3 and 4 and vice versa. In such an embodiment, the free stream airflow collides with the notched intake port 410 and enters the intake aperture 123. As shown in the figures, the notched intake port 410 comprises a cutaway region that defines a recessed second face 424 that is inset from the extended portion of the distal end 103, and which exposes the free airstream intake aperture 123 at least partially to the leading edge 104. In some embodiments, the notched intake port 410 may optionally further comprise the slot 428 inset from the recessed face 424 that traverses across at least a portion of the intake aperture 123. The slot 428 may be separated from the leading edge 104 by a lip 426. In one embodiment the extended face 424 of the distal end 103 is oriented normal to the probe axis 106 and/or is a flat surface.

The notched intake port 410 converts the airflow that collides with the extended portion of the distal end 103 into a high pressure region immediately in front of the intake aperture 123. For embodiments that include the slot feature 128, this feature facilitates conversion of the airflow that collides with the notched intake port 410 into a stable high pressure vortex immediately in front of the intake aperture 123. Both serve to direct air into the intake aperture 123 and further into the first and second annuluses 134 and 136. Unheated air is directed into annulus 134 by the stable vortex and/or high pressure region while air that is partially heated by contact with the probe body 102 is drawn into annulus 136. This prevents the heated air from entering at annulus 134, enhancing the ability to measure the proper total temperature of the air with this probe 100. When the slot feature 428 is provided, it may be oriented perpendicular to the to the in-flight airflow direction (i.e., normal to the plane that intersects the leading edge 104 and trailing edge 105). In one embodiment, the slot feature 428 is cut into the recessed second face 424 to traverse across approximately 20%-50% of the area of the intake aperture 123.

Also as illustrated in FIGS. 2A and 2B, the heat shield 132 in some embodiments may comprise a scarfed shield opening as shown at 133. That is, the edge of the heat shield 132 exposed through the free airstream intake aperture 123 has an angle such that the heat shield 132 edge is higher towards the leading edge 104 and slopes downward towards trailing edge 105. This scarfed feature of the heat shield 132 separates heated boundary layer air from the total temperature measurement air without collecting ice on the trailing edge of the heat shield 132 which would be exposed at the free airstream intake aperture 123. As an airflow containing ice crystals enters the intake aperture 123 of TAT probe 100, the scarfed shield 133 encourages ice crystals to travel over and past the intake to the first annulus 134 leading to the temperature sensor element 130. Instead of impacting on the trailing side of the heat shield 132, the downward angle of the scarfed shield 133 permits the crystals to reach to the back of the intake to the second annulus 136 and impact on the heated probe body 102 and melt.

EXAMPLE EMBODIMENTS

Example 1 includes an air data probe, the probe comprising: a probe base; a probe body having a leading edge and a trailing edge and extending from the probe base along a first axis, the probe body comprising: a first interior airflow passage defining a first annulus aligned with the first axis; a temperature sensor positioned within the first airflow passage and aligned with the first axis; a tubular heat shield defining an exterior wall of at least part of the first interior airflow passage, wherein the temperature sensor is positioned within the tubular heat shield; a second interior airflow passage comprising a second annulus aligned with the first axis, wherein the second annulus is defined by a space between the tubular heat shield and an interior wall of the probe body, wherein the tubular heat shield separates the first annulus from the second annulus; an intake port positioned at a distal end of the probe body, the intake port having a free airstream intake aperture that opens to the first interior airflow passage and the second interior airflow passage; a heated airflow passage separate from the first interior airflow passage and the second interior airflow passage, the heated airflow passage having a forced air input port configured to couple to a pressurized air supply source, the heated airflow passage following a path that travels within the probe body; an integrated air ejector coupled to heated airflow passage, the integrated ejector configured to motivate a free stream of air into the free airstream intake aperture and through the first and second air passages to an ejector exhaust port.

Example 2 includes the probe of example 1, wherein the ejector exhaust port is positioned at a distal surface on the distal end of the probe body.

Example 3 includes the probe of any of examples 1-2, wherein the ejector is positioned in the trailing edge of the probe body parallel to the probe axis.

Example 4 includes the probe of any of examples 1-3, wherein the tubular heat shield at the free air inlet is scarfed at a downward angle towards the trailing edge of the probe body Example 5 includes the probe of any of examples 1-4, the air ejector comprising: an integrated ejector nozzle coupled to the heated airflow passage; an ejector exhaust chamber; and a low pressure aperture within the ejector exhaust chamber; wherein the first interior airflow passage and the second interior airflow passage merge together within the probe body and discharge into the ejector exhaust chamber at the low pressure aperture; wherein the integrated ejector nozzle is configured to discharge a heated air stream from the heated airflow passage into the ejector exhaust chamber generating a low pressure partial vacuum at the low pressure aperture that pulls air into the ejector exhaust chamber from the low pressure aperture.

Example 6 includes the probe of any of examples 1-5, wherein the intake port comprises a slot inset from a face of the intake port, wherein the slot traverses across at least a portion of the intake aperture.

Example 7 includes the probe of any of examples 1-6, wherein the intake aperture opens to both the first annulus and the second annulus.

Example 8 includes the probe of example 7, wherein the first interior airflow passage and the second interior air-flow passage are concentric tubular airflow passages.

Example 9 includes the probe of any of examples 1-8, the probe further comprising: at least one heating element positioned within the probe and configured to heat air flowing through the heated airflow passage.

Example 10 includes the probe of any of examples 1-9, wherein the intake port comprises a notched intake port that further includes a slot inset from a recessed face of the notched intake port; wherein the flow traverses across at least a portion of the intake aperture perpendicularly to the open channel.

Example 11 includes the probe of any of examples 1-10, wherein the probe body includes one or more heat transfer elements that extend into the air flow path of the heated airflow passage.

Example 12 includes the probe of any of examples 1-11, wherein the heated airflow passage directs heated air to pass along the leading edge of the probe body prior to discharging into the integrated air ejector.

Example 13 includes an on-board total air temperature data probe deicing system, the system comprising: an on-board pressurized air source; a total air temperature probe, the total air temperature probe comprising: a probe base; a probe body having a leading edge and a trailing edge and extending from the probe base along a first axis, the probe body comprising: a first interior airflow passage defining a first annulus aligned with the first axis; a temperature sensor positioned within the first airflow passage and aligned with the first axis; a tubular heat shield defining an exterior wall of at least part of the first interior airflow passage, wherein the temperature sensor is positioned within the tubular heat shield; a second interior airflow passage comprising a second annulus aligned with the first axis, wherein the second annulus is defined by a space between the tubular heat shield and an interior wall of the probe body, wherein the tubular heat shield separates the first annulus from the second annulus; an intake port positioned at a distal end of the probe body, the intake port having a free airstream intake aperture that opens to the first interior airflow passage and the second interior airflow passage; a heated airflow passage separate from the first interior airflow passage and the second interior airflow passage, the heated airflow passage having a forced air input port configured to couple to the pressurized air source, the heated airflow passage following a path that travels within the probe body; an integrated air ejector coupled to heated airflow passage, the integrated ejector configured to motivate a free stream of air into the free airstream intake aperture and through the first and second air passages to an ejector exhaust port.

Example 14 includes the system of example 13, wherein the probe base is mounted to an aircraft surface such that the probe is exposed to the free stream total temperature.

Example 15 includes the system of any of examples 13-14, wherein the probe base is mounted upstream of an engine inside of the engine inlet.

Example 16 includes the system of any of examples 13-15, wherein the on-board pressurized air source comprises a bleed air source from an aircraft engine compressor.

Example 17 includes the system of any of examples 13-16, further comprising at least one heating element configured to heat air supplied to the forced air input port.

Example 18 includes the system of any of examples 13-17, wherein the ejector exhaust port is positioned at a distal surface on the distal end of the probe body.

Example 19 includes the system of any of examples 13-18, wherein the tubular heat shield at the free air inlet is scarfed at a downward angle towards the trailing edge of the probe body Example 20 includes the system of any of examples 13-19, the air ejector comprising: an integrated ejector nozzle coupled to the heated airflow passage; an ejector exhaust chamber; and a low pressure aperture within the ejector exhaust chamber; wherein the first interior airflow passage and the second interior airflow passage merge together within the probe body and discharge into the ejector exhaust chamber at the low pressure aperture; wherein the integrated ejector nozzle is configured to discharge a heated air stream from the heated airflow passage into the ejector exhaust chamber generating a low pressure partial vacuum at the low pressure aperture that pulls air into the ejector exhaust chamber from the low pressure aperture.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. An air data probe, the probe comprising:
a probe base;
a probe body having a leading edge and a trailing edge and extending from the probe base along a first axis, the probe body comprising:
 a first interior airflow passage defining a first annulus aligned with the first axis;
 a temperature sensor positioned within the first airflow passage and aligned with the first axis;
 a tubular heat shield defining an exterior wall of at least part of the first interior airflow passage, wherein the temperature sensor is positioned within the tubular heat shield;
 a second interior airflow passage comprising a second annulus aligned with the first axis, wherein the second annulus is defined by a space between the tubular heat shield and an interior wall of the probe body, wherein the tubular heat shield separates the first annulus from the second annulus;

an intake port positioned at a distal end of the probe body, the intake port having a free airstream intake aperture that opens to the first interior airflow passage and the second interior airflow passage;

a heated airflow passage separate from the first interior airflow passage and the second interior airflow passage, the heated airflow passage having a forced air input port configured to couple to a pressurized air supply source, the heated airflow passage following a path that travels within the probe body;

an integrated air ejector coupled to the heated airflow passage, the integrated ejector configured to utilize an airflow from the heated airflow passage to generate a pressure differential to motivate a free stream of air into the free airstream intake aperture and through the first and second air passages to an ejector exhaust port.

2. The probe of claim 1, wherein the ejector exhaust port is positioned at a distal surface on the distal end of the probe body.

3. The probe of claim 1, wherein the ejector is positioned in the trailing edge of the probe body parallel to the probe axis.

4. The probe of claim 1, wherein the tubular heat shield at the free air inlet is scarfed at a downward angle towards the trailing edge of the probe body.

5. The probe of claim 1, the air ejector comprising:
an integrated ejector nozzle coupled to the heated airflow passage;
an ejector exhaust chamber; and
a low pressure aperture within the ejector exhaust chamber;
wherein the first interior airflow passage and the second interior airflow passage merge together within the probe body and discharge into the ejector exhaust chamber at the low pressure aperture;
wherein the integrated ejector nozzle is configured to discharge a heated air stream from the heated airflow passage into the ejector exhaust chamber generating a low pressure partial vacuum at the low pressure aperture that pulls air into the ejector exhaust chamber from the low pressure aperture.

6. The probe of claim 1, wherein the intake port comprises a slot inset from a face of the intake port, wherein the slot traverses across at least a portion of the intake aperture.

7. The probe of claim 1, wherein the intake aperture opens to both the first annulus and the second annulus.

8. The probe of claim 7, wherein the first interior airflow passage and the second interior air-flow passage are concentric tubular airflow passages.

9. The probe of claim 1, the probe further comprising:
at least one heating element positioned within the probe and configured to heat air flowing through the heated airflow passage.

10. The probe of claim 1, wherein the intake port comprises a notched intake port that further includes a slot inset from a recessed face of the notched intake port;
wherein the flow traverses across at least a portion of the intake aperture perpendicularly to the open channel.

11. The probe of claim 1, wherein the probe body includes one or more heat transfer elements that extend into the air flow path of the heated airflow passage.

12. The probe of claim 1, wherein the heated airflow passage directs heated air to pass along the leading edge of the probe body prior to discharging into the integrated air ejector.

13. An on-board total air temperature data probe deicing system, the system comprising:
an on-board pressurized air source;
a total air temperature probe, the total air temperature probe comprising:
a probe base;
a probe body having a leading edge and a trailing edge and extending from the probe base along a first axis, the probe body comprising:
a first interior airflow passage defining a first annulus aligned with the first axis;
a temperature sensor positioned within the first airflow passage and aligned with the first axis;
a tubular heat shield defining an exterior wall of at least part of the first interior airflow passage, wherein the temperature sensor is positioned within the tubular heat shield;
a second interior airflow passage comprising a second annulus aligned with the first axis, wherein the second annulus is defined by a space between the tubular heat shield and an interior wall of the probe body, wherein the tubular heat shield separates the first annulus from the second annulus;
an intake port positioned at a distal end of the probe body, the intake port having a free airstream intake aperture that opens to the first interior airflow passage and the second interior airflow passage;
a heated airflow passage separate from the first interior airflow passage and the second interior airflow passage, the heated airflow passage having a forced air input port configured to couple to the pressurized air source, the heated airflow passage following a path that travels within the probe body;
an integrated air ejector coupled to the heated airflow passage, the integrated ejector configured to utilize an airflow from the heated airflow passage to generate a pressure differential to motivate a free stream of air into the free airstream intake aperture and through the first and second air passages to an ejector exhaust port.

14. The system of claim 13, wherein the probe base is mounted to an aircraft surface such that the probe is exposed to the free stream total temperature.

15. The system of claim 13 wherein the probe base is mounted upstream of an engine inside of the engine inlet.

16. The system of claim 13, wherein the on-board pressurized air source comprises a bleed air source from an aircraft engine compressor.

17. The system of claim 13, further comprising at least one heating element configured to heat air supplied to the forced air input port.

18. The system of claim 13, wherein the ejector exhaust port is positioned at a distal surface on the distal end of the probe body.

19. The system of claim 13, wherein the tubular heat shield at the free air inlet is scarfed at a downward angle towards the trailing edge of the probe body.

20. The system of claim 13, the air ejector comprising:
an integrated ejector nozzle coupled to the heated airflow passage;
an ejector exhaust chamber; and a low pressure aperture within the ejector exhaust chamber;

wherein the first interior airflow passage and the second interior airflow passage merge together within the probe body and discharge into the ejector exhaust chamber at the low pressure aperture;

wherein the integrated ejector nozzle is configured to discharge a heated air stream from the heated airflow passage into the ejector exhaust chamber generating a low pressure partial vacuum at the low pressure aperture that pulls air into the ejector exhaust chamber from the low pressure aperture.

* * * * *